3,564,477
CONDUCTOR SEAL
Salvatore J. Pompei, Port Clinton, Ohio, assignor to General Motors Corporation, Detroit, Mich., a corporation of Delaware
Filed Aug. 11, 1969, Ser. No. 848,963
Int. Cl. H01r *39/02;* F16c *19/00*
U.S. Cl. 339—5                                            6 Claims

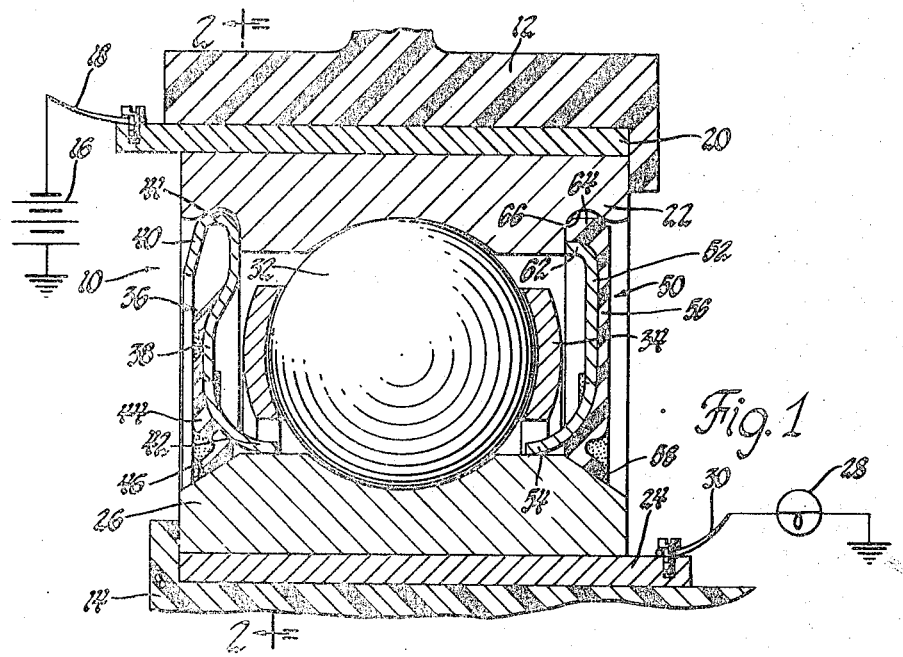
Fig. 1
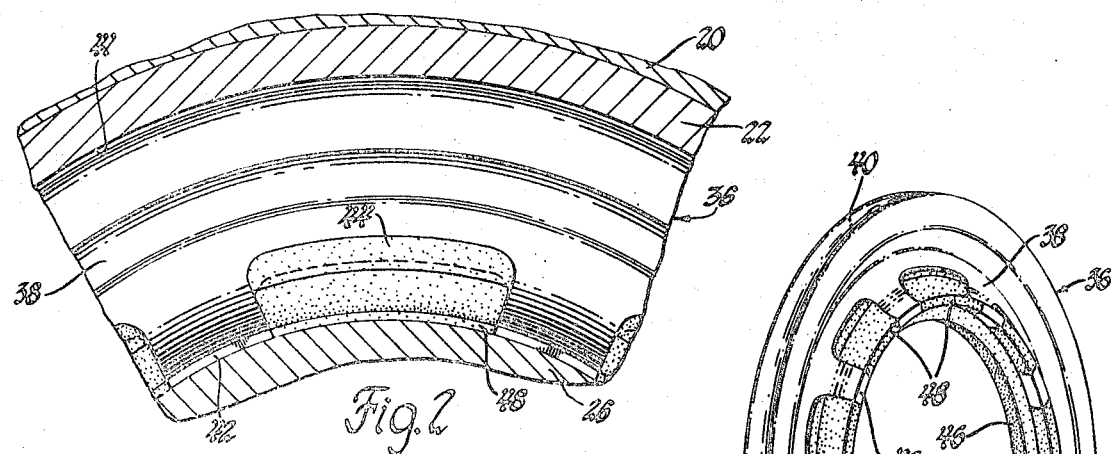
Fig. 2
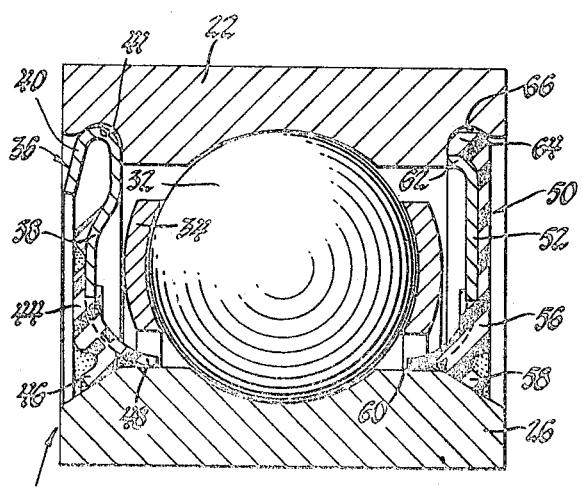
Fig. 3
Fig. 4
INVENTOR.
Salvatore J. Pompei
BY
F. J. Fodale
ATTORNEY

United States Patent Office 3,564,477
Patented Feb. 16, 1971

ABSTRACT OF THE DISCLOSURE

A ball bearing is equipped with an electrically conductive seal which both seals the annulus between the races and is adapted to carry an appreciable current between the races without damaging the balls. Electrical contact between the seal and the relatively rotating race is established by a plurality of fingers on the seal which are inboard of an annular sealing lip.

---

My invention relates generally to antifriction bearings and more specifically to an antifriction bearing equipped with an electrically conductive seal.

In rotating electrical machinery by which I broadly include any electrical device including a rotating part, current is often passed between the stationary part of the device and the rotating part of the device by means of a slip ring. The rotating part is often journaled by an antifriction bearing which includes a seal.

Broadly it is the object of my invention to combine the functions of a seal and a slip ring into a single device for use with an antifriction bearing whereby current may be passed between the stationary part of a rotating electrical machine and its rotating part through the bearing in which its rotating part is journaled.

Another object of my invention is to provide an antifriction bearing through which an appreciable amount of current can be passed without damaging the antifriction elements of the bearing.

Another object of my invention is to provide an antifriction bearing which includes an electrically conductive seal to shunt current away from the antifriction elements of the bearing when current is passed through the bearing.

Another object of my invention is to provide an antifriction bearing having an electrically conductive seal in which the slip connection between the seal and one of the races is made interior of the bearing.

Another object of my invention is to provide an antifriction bearing having an electrically conductive seal in which the drag produced between the seal and the relatively rotating race is comparable to other seals of the wiping lip type.

Another object of my invention is to provide an antifriction bearing having a seal with a lip wipingly engaging the relatively rotating race in which a slip ring has been incorporated into the seal in such a manner as to improve the sealing qualities of the seal in addition to adding a current-carrying ability to the seal.

With these and other objects in view, as will hereinafter more fully appear, and which will be more particularly pointed out in the appended claims, reference is now made to the following description taken in connection with the accompanying drawings in which:

FIG. 1 is an axial section taken through an antifriction bearing which in accordance with my invention is equipped with an electrically conductive seal. A permanently secured seal is swagged into the mounting groove on the left side of the bearing whereas a removable type seal is illustrated on the right side of the bearing.

FIG. 2 is a section taken along the line 2—2 of FIG. 1 showing the relationship between the left-hand seal of FIG. 1 and the bearing races.

FIG. 3 is a view similar to FIG. 1 with the bearing removed from its environment and a section taken through a different radial plane of the seals to illustrate a feature of the invention.

FIG. 4 is a perspective view of the left-hand seal shown in FIG. 1.

Referring now to the drawings and more particularly to FIG. 1, a bearing in accordance with my invention is indicated generally at 10 in the environment of a rotating electrical machine represented schematically. More specifically, the machine is represented by a stationary support wall 12 of an electrically nonconductive or insulating material. The machine is further represented by a nonconductive bushing sleeve 14 mounted on a rotatable shaft (not shown). The bearing 10 journals the shaft and bushing 14 in the support wall 12 and is also used to carry a current into the rotating part of the machine. This is illustrated graphically by a schematic battery 16 connected through a lead 18 to a terminal bar 20 which makes contact with the outer race 22 of the bearing 10. A second terminal bar 24 in contact with the inner race 26 is connected to a load 28 and grounded through a lead 30. The schematic load 28 represents a load physically associated with the shaft and rotatable with it.

Focussing now on the bearing 10 and the manner in which current is passed between the races 22 and 26, it is to be noted that the annular space between the races in which the complement of balls 32 spaced by cage 34 are located is sealed on each side by seals 36 and 38, respectively.

The seal 36 comprises a metallic washer 38. The outer margin 40 of the metallic washer 38 is reversely folded upon being swagged into the mounting groove 41 on the outer race 22. The mounting of seals in this manner is well known and shown in United States Letters Patent No. 1,917,988 issued to Samuel R. Large on July 11, 1933. Extending radially inwardly from the inner margin of the metallic washer 38 are a plurality of fingers 42 as best shown in FIG. 2. Returning to FIG. 1, it is seen that the fingers 42 are arcuate in section and engage the land of the inner race 26. Bonded to the outboard face of the metal washer 38 is an elastomeric annulus 44 which terminates in an annular lip 46 at its inner margin. The annular lip 46 wipingly engages a frusto-conical surface on the inner race 26 which is located outboard of the land on the inner race which is contacted by the fingers 42. Referring now to FIG. 3 which sections the seal at a different radial plane, it is to be noted that the elastomeric annulus 44 extends through the fingers 42 with a small portion bonded to the inboard side of the washer 38. The annulus 44 not only extends through the fingers 42 but also includes segments 48 bonded between adjacent fingers 42 so that a second continuous lip is formed consisting of the elastomeric segments 48 alternated with the fingers 42. This second continuous lip (best shown in FIG. 4) forms a second sealing lip in addition to the fingers 42 providing a slip ring function. The fingers 42 are preferably slightly spring-loaded into the inner race 26 in order to insure good electrical contact and to accommodate slight eccentricity and runout between the races.

The metal washer 38 is preferably made of a material which is both a good electrical conductor and softer than the bearing race. I have found that a seal in which the metal washer is a phosphor bronze alloy conducts a current of approximately 5 amps when the races are subjected to a potential of about 12 volts. This current is conducted without any damage to the general types of elastomers which are normally used in seals. It is to be understood that a bearing having a single seal such as that illustrated on the left side of the bearing in FIG. 1 is within the spirit and scope of my invention. The electrically conductive seal shown in the right-hand side of the bearing is for the purposes of additional disclosure and accordingly, it is not to be construed as my invention requiring two electrically conductive seals. This is not to say, however, that it is not appreciated that two electrically conductive seals provide parallel paths for the flow of current and, therefore, provide for the flow of more current. However, I do wish to point out that in some instances, a conductor seal may be used on one side and an ordinary seal or shield on the other. In some instances, the seal or shield on the other side of the bearing may not be provided.

The seal 50 is identical to the seal 36 in the area of the sealing lips and the conductor fingers. Namely it includes a metal washer 52, arcuate fingers 54, and a bonded elastomeric member 56 with its sealing lip 58 and segments 60 between the fingers 54. The seal 50 differs, however, at its outer margin where the metal washer 52 terminates in an inturned flange 62 and the elastomeric body 56 extends over the outer surface of the flange and forms a bead 64. The bead 64 is received in the mounting groove 66 and mounts the seal 50 in such a manner that the exposed edge on the flange 62 is urged into good electrical contact with the outer race 22. The seal 50 by reason of the resilient bead 64 is removable from the bearing 10 without damaging the seal.

I wish it to be understood that I do not desire to be limited to the exact details of construction shown and described, for obvious modifications will occur to a person skilled in the art.

I claim:

1. An antifriction bearing comprising inner and outer races radially spaced to define an annular space therebetween, a complement of antifriction elements in said annular space and rollably contacting said races whereby said races are relatively rotatable, and a conductor seal sealing said annular space on one side of said antifriction elements, said conductor seal being mounted on one of said races and including an annular elastomeric lip wipingly engaging the other of said races to exclude deleterious matter from said antifriction elements, said conductor seal further including a metallic washer means in physical contact with said one race, and in sliding contact with said other race inboard of said elastomeric lip whereby said seal is adapted to flow electric current between said races and to shunt electrical current from said antifriction elements when said races are at a different electrical potential.

2. An antifriction bearing as defined in claim 1 wherein the margin of said metallic washer means in sliding contact with said other race is a plurality of circumferentially spaced arcuate fingers curving inwardly toward said antifriction elements, said fingers being resilient and biased into engagement with said other race whereby said fingers accommodate small irregularities and eccentricities of the other race without interrupting the flow of current therebetween.

3. An antifriction bearing as defined in claim 2 wherein elastomeric elements extend between said fingers forming a continuous annular lip whereby a second sealing lip is provided inboard of said first sealing lip.

4. An antifriction bearing as defined in claim 3 wherein said races are steel, said washer means is a phosphor bronze alloy annulus with said fingers extending integrally from a margin thereof, and said first sealing lip and said elements are an integral part of an elastomeric body bonded to said annulus.

5. An antifriction bearing comprising a unit-handled assembly of inner and outer relatively rotatable races radially spaced by a complement of antifriction elements rollably contacting said races, and a conductor seal mounted on one of said races and extending radially into contact with the other of said races, said conductor seal including a metallic means in electrical contact with said one race at one periphery thereof, said metallic means having a plurality of arcuate fingers at its other periphery extending inwardly toward said antifriction elements and in sliding engagement with the other of said races, said conductor seal further including an elastomeric annulus bonded to the outboard face of said metallic annulus, said elastomeric annulus having an annular lip free from said metallic means and wipingly engaging said other race outboard of said fingers.

6. The antifriction bearing as defined in claim 5 wherein said elastomeric body includes a portion molded between said fingers whereby a second sealing lip is provided inboard of said first sealing lip.

References Cited

UNITED STATES PATENTS 3,271,723   9/1966   Willing _____ 339—5

FRED C. MATTERN, Jr., Primary Examiner

F. SUSKO, Assistant Examiner

U.S. Cl. X.R.

308—1